Oct. 20, 1953  C. R. BUSCH  2,656,019
BRAKE BEAM
Filed April 14, 1950  3 Sheets-Sheet 1
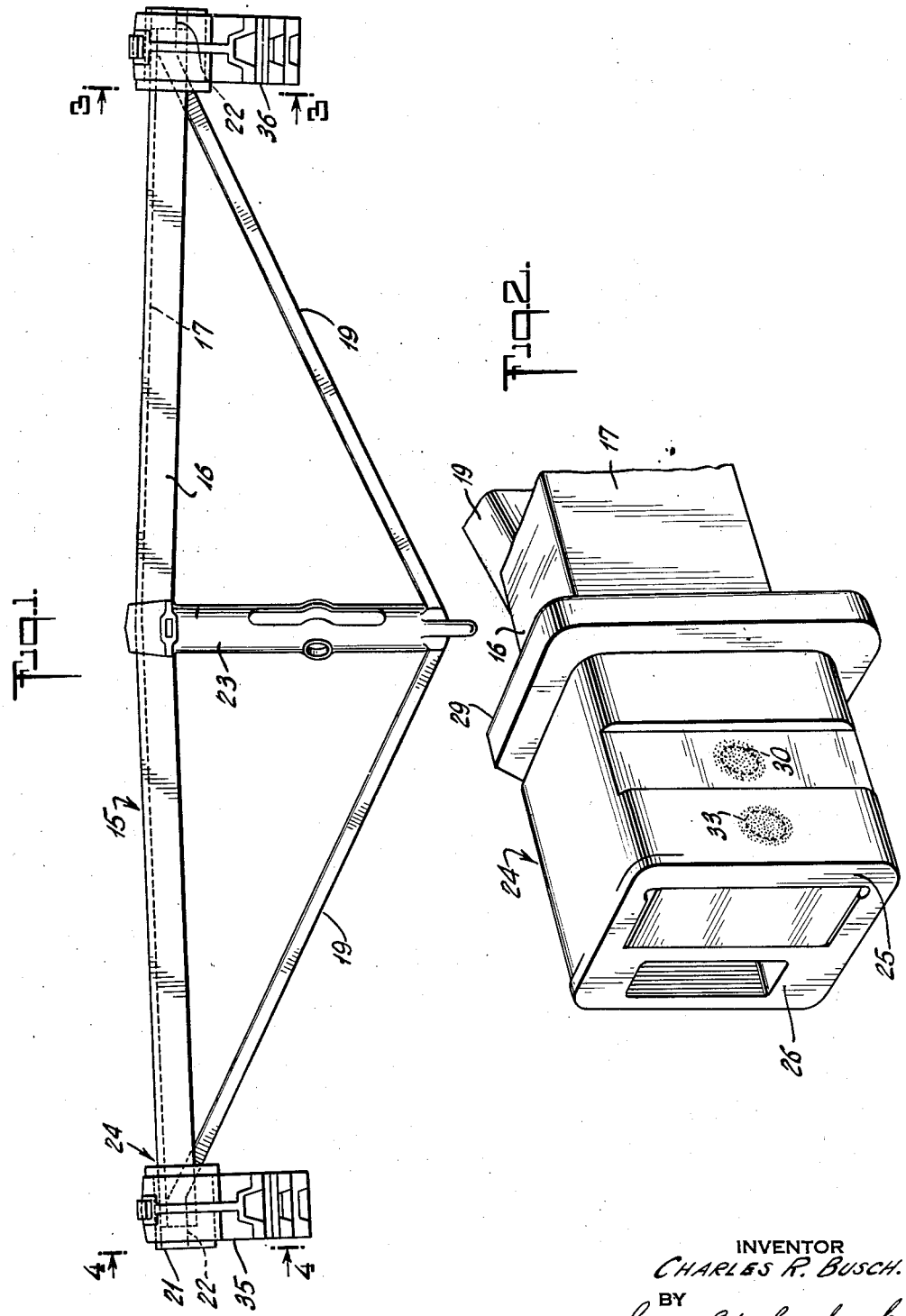
INVENTOR
CHARLES R. BUSCH.
BY
Geo. L. Wheelock
ATTORNEY Oct. 20, 1953    C. R. BUSCH    2,656,019
BRAKE BEAM
Filed April 14, 1950    3 Sheets-Sheet 2
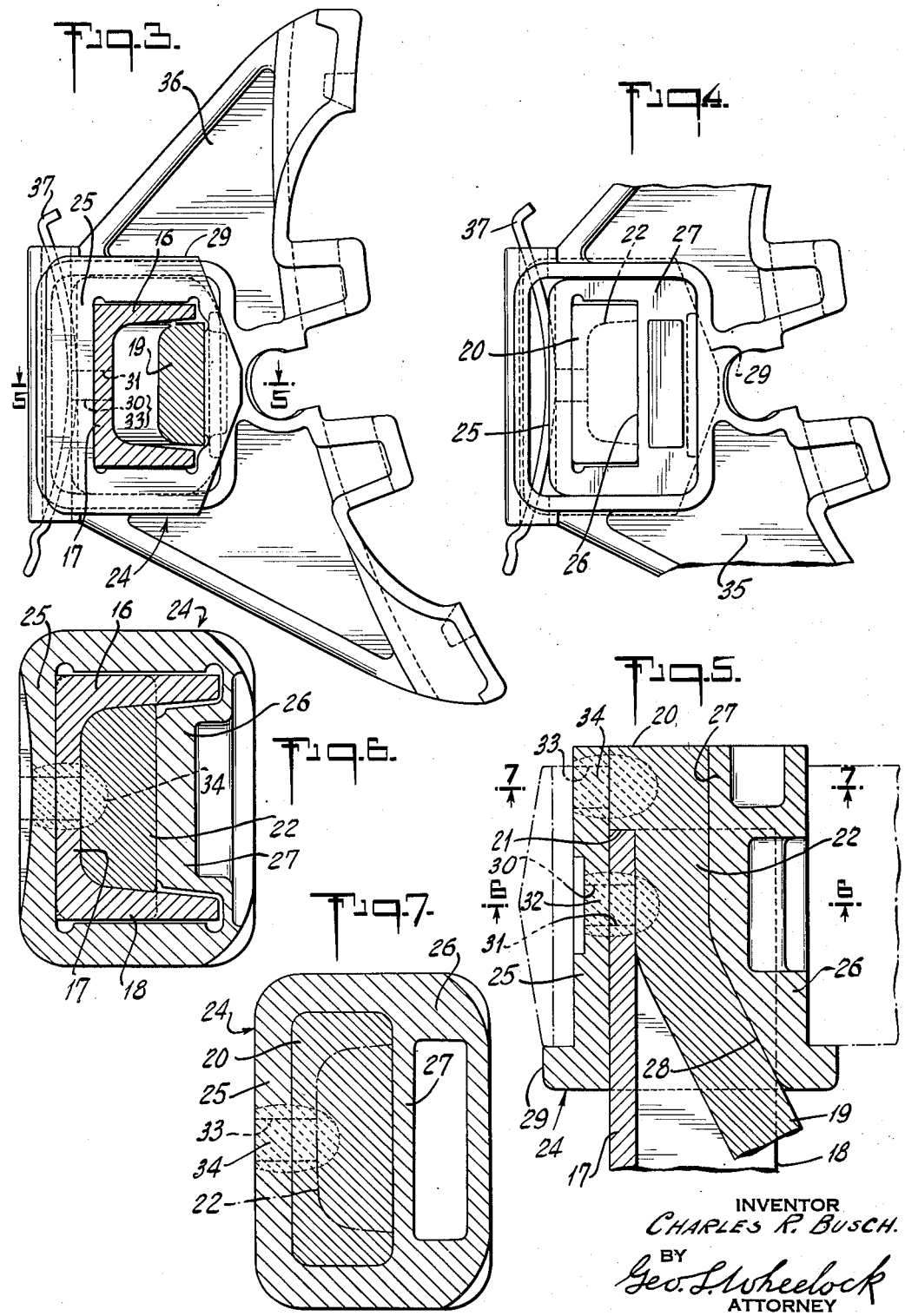
INVENTOR
CHARLES R. BUSCH.
BY
Geo. L. Wheelock
ATTORNEY Oct. 20, 1953 — C. R. BUSCH — 2,656,019
BRAKE BEAM
Filed April 14, 1950 — 3 Sheets-Sheet 3
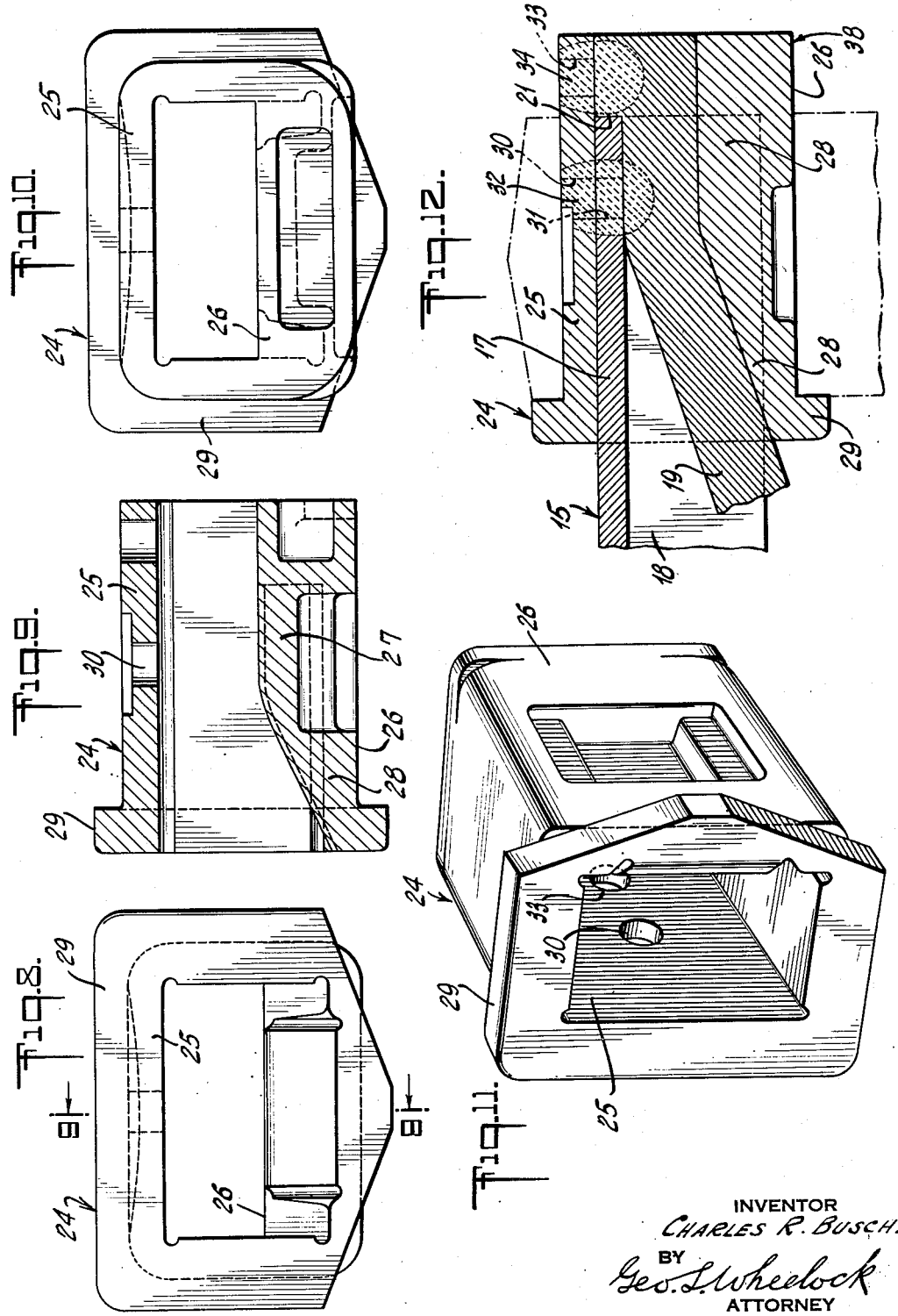
INVENTOR
*CHARLES R. BUSCH.*
BY
*Geo. L. Wheelock*
ATTORNEY Patented Oct. 20, 1953

2,656,019

UNITED STATES PATENT OFFICE 2,656,019

BRAKE BEAM

Charles R. Busch, Orange, N. J., assignor to Buffalo Brake Beam Company, New York, N. Y., a corporation of New York Application April 14, 1950, Serial No. 155,993

3 Claims. (Cl. 188—223.1)

When a hanger type of truss brake beam in particular, though not necessarily of that type so far as the present invention is concerned, has the compression and tension members united in and to substantial sleeves or housings, or what are preferably designated as truss locks, for receiving freely removable brake heads, and where the ends of the tension member have upset or offset abutments engaging with the terminals of the compression member, it has been found in tests thereof that it is desirable to unite the compression member and truss locks by one or more welds at each of the ends of the compression member which welds also permeate and unite the ends of the tension member therewith and to use entirely separate welds spaced therefrom and which unite the truss locks directly with, and only with, the upset abutments for the sake of safety and increased life of the brake beam.

If, as required in the fatiguing of truss brake beams, a nine-ton load is applied at the strut of the beam at the rate of fifty times a minute, it deflects the beam downwardly $\frac{1}{16}''$, and this constant loading has a tendency to pull the compression member downward thus lengthening it as it has been previously bowed by cambering, with the result that the compression member hammers at the shoulders of the upset abutments and after a few hundred thousand strokes one, or both, abutments will even be damaged or entirely broken off.

However, by locating some welds so as to unite the compression member, the tension member and the truss locks and adding entirely separate welds outboard thereof and between the truss locks and the upset abutments at the ends of the tension member, the life of a truss brake beam according to the present invention has been lengthened to withstand approximately a million and a half strokes or reversals without breaking any of its parts, thus producing a superior unitary brake beam structure.

The preceding being the principal objects of the present invention, the same consists of certain features of construction and combinations of parts to be herein described and then pointed out in the claims, reference being had to the accompanying drawings showing suitable embodiments of the invention and wherein—

Fig. 1 is a complete top plan of a brake beam according to the present invention;

Fig. 2 is an enlarged perspective view of a broken away end portion of the brake beam;

Fig. 3 is a transverse section on the line 3—3 of Fig. 1;

Fig. 4 is an end view of Fig. 1 as indicated by the line 4—4;

Fig. 5 is a longitudinal section on the line 5—5 of Fig. 3;

Fig. 6 is a transverse section on line 6—6 of Fig. 5;

Fig. 7 is a transverse section on line 7—7 of Fig. 5;

Fig. 8 is an elevation of the inboard end of the truss lock;

Fig. 9 is a longitudinal section on the line 9—9 of Fig. 8;

Fig. 10 is an end elevation of the outboard end of the truss lock;

Fig. 11 is a perspective view of the truss lock showing some of the interior thereof; and Fig. 12 illustrates a modification in longitudinal section, and a brake head mounted thereon in broken lines.

Referring to Figs. 1, 5 and 7 of the drawings, there is illustrated a cambered compression member 15 having webs 16, 17 and 18, the web 17 being substantially vertical and the substantially parallel webs 16 and 18 extending therefrom in the same direction as each other at the edges thereof. Preferably a bowed tension member 19 of strap form is employed having its greatest width substantially vertical. Each end of the tension member is provided with an upset or offset abutment 20, this extending partly around the end so as to provide an inboardly facing shoulder 21 around three sides of said member, namely at the back and the upper and lower sides of the tension member. Between the abutment 20 and the bow of the tension member the latter is provided at each end with deflected end portions 22 extending outwardly to each abutment, each of which end portions 22 is snugly nested within an end of the compression member so that the shoulder 21 at each end engages with the three webs of the compression member thereby attaching the two members together. A suitable strut 23 is employed to connect the compression and tension members. Such assembly is substantially well known.

To successfully maintain the truss, suitable housings or truss locks 24 adapted to receive what are freely removable brake heads are mounted on the associated ends of the compression and tension members.

Referring to the figures of the drawings generally, each truss lock 24 in brief includes a solid sleeve-like body having preferably a rectangular girth or substantially so and of suitable length. Each truss lock 24 being hollow provides a socket for the corresponding ends of the compression and tension members, it being formed with a back wall 25 and a front wall 26, of which the front wall is the thickest at 27, and the wall 26 being gradually decreased however to provide an inclined bearing 28 for the tension member. The inboard end of the truss lock preferably has a flange or rim 29 for restricting the inboard position of a removable brake head.

A truss lock having been pushed on to each end of the assembled compression and tension members, the outwardly bowed portion of the tension member 19 has bearing on the reduced and inclined surface 28 for the full length of said surface, and the end portions 22 will flatly bear on the intermediate web of the compression member. The abutment 20 on the tension member at the same time will snugly fit into the truss lock between the back wall 25 and the thicker part 27 of the front wall.

As shown in Figs. 2, 5, 6 and 7 to 12, each truss lock has a hole 30 which registers with a hole 31 in the end of the compression member and within which a weld 32 is made, and the truss lock also has a hole 33 outboard of hole 30 and registering with abutment 20, it being spaced from hole 30 a suitable distance beyond the compression member and in which an entirely separate weld 34 is made, the weld 32 permeating the end portion 22 of the tension member and the weld 34 permeating the abutment 20 thereof.

Although these two welds 32, 34 at each end of the brake beam are made independent of each other they mutually serve to satisfactorily combine the compression and tension members and the truss locks together to form a solid brake beam unit, and will result in obtaining a brake beam which will measure up to the requirements and up to the amount of required preliminary fatiguing of truss brake beams, thus providing a brake beam unit which will withstand the tremendous pressures brought to bear thereon due to applying the brake shoes to the wheels of a railway car.

Each weld preferably is made about ½" across but they will each penetrate into the surrounding metal for a distance of approximately ¾" as such welds have proven to be satisfactory for the purpose.

Brake heads 35, 36 are preferably used such as are shown and described in Patent No. 2,490,204, dated December 6, 1949, although any other desirable and useable type of readily removable brake head may be employed. Each such brake head is strongly and substantially held rigidly on the truss lock by a spring key 37 or shock absorber.

Referring to Fig. 12 a modification of the described brake beam is illustrated and the same reference numerals are used therein for parts corresponding with similar parts in the other figures of the drawings.

In this case the compression member 15 terminates substantially in line with the plane of the outboard side of the brake head which is indicated by broken lines, and the truss lock itself is longer than previously described as it extends at 38 beyond the outboard side of the brake head. Hence the truss lock extends beyond the zone thereof which is adapted to just receive the removable brake head. The shoulder 21 of the abutment on the end of the tension member would then be positioned substantially in the plane of the outboard side of the brake head, so that the hole 33 and weld 34 would be located beyond the brake head. Except for the described extension of the ends of the brake beam beyond the brake heads, the construction shown in Fig. 12 is the same as previously described.

Certain side frames have been made with a safety ledge to support the brake beam in case of hanger failure. This safety ledge was designed more particularly with the view of using a nutted type of brake beam wherein the tension rod extends beyond the brake head, and should the railroads wish to maintain the safety ledge it would still be useable by extending the parts shown in Fig. 12 beyond the brake head.

The sleeves, housings or truss locks can be made not only by forging or casting but of steel, iron, malleable iron or any other satisfactory material.

It will be obvious to those skilled in the art that more or less changes or modifications can be made in the described and illustrated brake beam without departing from the spirit of the invention and the scope of the appended claims.

What I claim is:

1. A truss brake beam, including a channel compression member with upper and lower webs and a web intermediate thereof, a tension member having aligned outwardly deflected end portions of substantially the same width as the intermediate web and extending parallel with such web in bearing contact with such web for their entire width, the deflected end portions extended beyond the terminals of the compression member and having backwardly offset abutments providing inboardly facing shoulders engaged lengthwise of the compression member in abutment with the said terminals, truss locks adapted to receive freely removable brake heads, the truss locks having longitudinal sockets snugly receiving, with a close fit all around, the ends of the compression member and the deflected ends of the tension member as well as the abutments, the intermediate web and the backs of the truss locks being directly united by through welds spaced inwardly from the abutments, such welds also uniting the outwardly deflected ends of the tension member with the intermediate web, and separate welds spaced from such welds and extending through the truss locks and into the abutments.

2. A truss brake beam, including a channel compression member with upper and lower webs and a web intermediate thereof, a tension member having aligned outwardly deflected end portions of substantially the same width as the intermediate web and seated in the channel of the compression member in complete bearing throughout with the corresponding surface of the channel, the deflected end portions extended beyond the terminals of the compression member and having backwardly offset abutments providing inboardly facing shoulders around the back and the upper and lower surfaces of the end portions of the tension member, such shoulders engaged lengthwise of the compression member and in abutment around the entire surface of said terminals, truss locks adapted to receive freely removable brake heads, the truss locks having longitudinal sockets snugly receiving, with a close fit all around, the ends of the compression member and the deflected ends of the tension member as well as the abutments, the intermediate web and the backs of the truss locks being directly united by through welds spaced inwardly from the abutments, such welds also uniting the outwardly deflected ends of the tension member with the intermediate web, and separate welds spaced from such welds and extending through the truss locks and into the abutments.

3. A truss brake beam, including a channel compression member with upper and lower webs and a web intermediate thereof, a tension member having aligned outwardly deflected end portions of substantially the same width as the intermediate web and seated in the channel of the compression member in complete bearing throughout with the corresponding surface of the channel, the deflected end portions extended beyond the terminals of the compression member and having backwardly offset abutments providing inboardly facing shoulders around the back and the upper and lower surfaces of the end portions of the tension member, such shoulders engaged lengthwise of the compression member and in abutment around the entire surface of said terminals, truss locks adapted to receive freely removable brake heads, the truss locks having longitudinal sockets snugly receiving, with a close fit all around, the ends of the compression member and the deflected ends of the tension member as well as the abutments, the intermediate web and the backs of the truss locks being directly united by through welds spaced inwardly from the abutments, such welds also uniting the outwardly deflected ends of the tension member with the intermediate web, and separate welds spaced from such welds and extending through the truss locks and into the abutments, and each truss lock extended outboard of the brake head receiving zone thereof, the abutments and separate welds also outboard of that zone.

CHARLES R. BUSCH.

References Cited in the file of this patent

UNITED STATES PATENTS

| Number | Name | Date |
|---|---|---|
| 1,236,145 | Burns | Aug. 7, 1917 |
| 2,493,239 | Ekholm | Jan. 3, 1950 |
| 2,493,913 | Busch | Jan. 10, 1950 |

FOREIGN PATENTS

| Number | Country | Date |
|---|---|---|
| 618,890 | France | Dec. 21, 1926 |